United States Patent [19]

Mönch

[11] Patent Number: 4,989,449
[45] Date of Patent: Feb. 5, 1991

[54] METHOD AND APPARATUS FOR DETERMINING A RESTORING MOMENT PRODUCED BY TAGENTIAL FORCES IN A TIRE TESTING OPERATION

[75] Inventor: Uwe Mönch, Bensheim, Fed. Rep. of Germany

[73] Assignee: Gebr. Hofmann GmbH & Co. KG Maschinenfabrik, Pfungstadt, Fed. Rep. of Germany

[21] Appl. No.: 466,954

[22] Filed: Jan. 18, 1990

[30] Foreign Application Priority Data

Mar. 21, 1989 [DE] Fed. Rep. of Germany ....... 3909308

[51] Int. Cl.$^5$ ............................................ G01M 17/02
[52] U.S. Cl. ........................................................ 73/146
[58] Field of Search ................................. 73/146, 8, 9

[56] References Cited

U.S. PATENT DOCUMENTS 3,942,370  3/1976  Grosch et al. ......................... 73/146
3,956,931  5/1976  Grosch et al. ......................... 73/146

Primary Examiner—Donald O. Woodiel
Attorney, Agent, or Firm—Cushman, Darby & Cushman

[57] ABSTRACT

In a method and an apparatus for determining the restoring moment produced by tangential forces in a tire testing operation, a tire to be tested is rolled against a test surface under identical rolling conditions in first and second measuring runs, the second of which is performed with the tire being turned round through 180° from its position in the first measuring run. The restoring moment which is related to the center of the contact surface at which the tire is in contact with the test surface is formed from the restoring moment values which are obtained in the first and second measuring runs. The apparatus includes an evaluation circuit having a subtracting means for subtracting the restoring moments obtained in the two measuring runs from each other and a dividing circuit for halving the output signal from the subtracting circuit, or alternatively the evaluation circuit includes an adding circuit for adding the restoring moments obtained in the two measuring runs and a dividing circuit for halving the output of the adding circuit together with a subtracting circuit for subtracting from each other the output from the dividing circuit and an input signal proportional to one of the restoring moments obtained in the two measuring runs.

12 Claims, 1 Drawing Sheet

METHOD AND APPARATUS FOR DETERMINING A RESTORING MOMENT PRODUCED BY TAGENTIAL FORCES IN A TIRE TESTING OPERATION

BACKGROUND OF THE INVENTION

In one form of a method of determining a restoring moment produced by tangential forces in a tire testing operation in a tire testing machine, a pneumatic tire is brought into contact with a test surface during a measuring run, and a rolling movement is produced as between the tire and the test surface. The area at which the tire is in contact with the test surface is referred to as the contact surface or contact patch and is sometimes also designated the footprint of the tire. The tangential force measurement values which are obtained in such a measuring run are used to form the restoring moment. The restoring moment is also referred to in the art as the torque steer effect. A specific procedure of that kind as is to be found in German patent specification No. 2 326 046 provides that, in the testing of pneumatic tires and in particular motor vehicle tires, measurement of the tangential forces produced is employed to determine the restoring moment which acts in the contact surface about an axis passing through the center of the contact surface, perpendicularly to the contact surface. A tire testing machine which operates on the basis of that procedure includes a test surface which is in the form of a rotatable test drum and inter alia force measurement transducers disposed on both sides of the test drum at the axis thereof. The force measurement transducers are arranged at equal spacings from a central plane of the test drum, which extends through the axis of the test drum normal thereto. The two transducers supply measurement signals proportional to the tangential forces which produce an effect in the tire contact surface during a measuring run. A signal which is proportional to the restoring moment is formed by multiplication with a signal corresponding to the spacing of the force measurement transducers from the central plane of the test drum, with a difference signal, for the two force measurement signals supplied by the transducers.

However that procedure does not take account of the fact that the contact surface or patch of the tire may be disposed in a displaced position relative to the central plane of the test drum which extends normal to the axis of the drum. That is a situation which may occur in many circumstances of use. That asymmetrical positioning of the contact surface of the tire in relation to the test drum results in a basic restoring moment which is superimposed on the measurement values. Accordingly there are situations in which the operating procedure results in the apparent measurement of a restoring moment, even when there is in fact no such restoring moment, in relation to the center of the pneumatic tire contact surface. That falsification of the measurement result is due to the fact that the tangential force of the tire does not act exactly in the middle of the spacing between the two force measurement transducers, that is to say symmetrically with respect to the central plane of the test drum.

SUMMARY OF THE INVENTION

An object of the invention is to provide a method of determining a restoring moment produced in testing of a tire during a measuring run, which at least substantially eliminates a basic restoring moment resulting from asymmetrical positioning of the tire contact surface on the test surface.

Another object of the invention is to provide a method of determining a restoring moment produced by tangential forces in a tire testing operation, which is capable of producing substantially accurate measurement results.

Still another object of the present invention is that of providing a method of determining a restoring moment produced by tangential force in a tire testing operation which provides compensation for mispositioning of the tire in relation to a test surface.

Still a further object of the invention is to provide an apparatus for determining a restoring moment produced by tangential forces in a tire testing operation, which can produce measurement results of enhanced accuracy.

In accordance with these and other objects, in accordance with the present invention a method of determining a restoring moment which is produced by tangential forces in a tire testing operation in a tire testing machine provides carrying out first and second measuring runs in each of which a tire to be measured, such as a pneumatic tire, is brought into contact by way of its contact surface with a test surface and is rolled against the test surface, with the restoring moment being formed from the tangential force measurement values which are obtained in that operation. Between the first and second measuring runs the tire is turned round and the direction of rotation of the tire drive is reversed. In that way the restoring moment which is related to the center of the contact surface of the tire is formed from the restoring moment values which are obtained from the first and second measuring runs.

In accordance with a further aspect of the invention the foregoing and other objects are attained by an apparatus for determining a restoring moment produced by tangential forces in a tire testing operation in a tire testing machine having a test surface against which a tire to be tested can be pressed by way of its contact surface and rolled thereagainst during a measuring run, force measurement transducer means for measuring tangential forces produced during the measuring run, and an evaluation circuit connected to the transducer means for producing an electrical signal which is proportional to the restoring moment. The evaluation circuit includes a subtracting circit for subtracting from each other the restoring moment values obtained in first and second measuring runs, in the second of which the tire is turned round relative to its position in the first measuring run and driven in such a way as to rotate in the same direction as its rotary movement in the first measuring run, and a dividing circuit connected to the output of the subtracting circuit and operable to halve the output signal of the subtracting circuit.

In a further apparatus in accordance with the invention for determining a restoring moment produced by tangential forces in a tire testing machine having a test surface against which a tire to be tested can be pressed by way of its contact surface and rolled thereagainst during measuring runs, force measurement transducer means for measuring tangential forces produced during the measuring runs and an evaluation circuit connected to the transducer means to produce an electrical signal proportional to the restoring moment are provided. The evaluation circuit includes an adding circuit for adding the restoring moment values obtained in first and second measuring runs, in the second of which the tire is turned round relative to its position in the first measuring run and driven in such a way as to rotate in the same direction as its rotary movement in the first measuring run, a dividing circuit having an input connected to the output of the adding circuit and adapted to halve the output signal of the adding circuit, and a subtracting circuit having first and second inputs, its first input being adapted to receive an input signal proportional to a restoring moment value obtained in the first and second measuring runs and its other input being adapted to receive the output signal from the dividing circuit.

Accordingly, the invention provides firstly carrying out a first measuring run in which the restoring moment is formed from the tangential forces involved, which can be effected for example in the manner described in above-mentioned German patent specification No. 2 326 046. The tire is then turned round in its position of mounting in the tire testing machine, that is to say it is turned round so that for example the side of the tire which faced towards one side of the machine then faces towards the other side of the machine, and the drive of the tire testing machine is then switched over to produce a drive effect in the opposite direction. It will be seen that reversal of the drive effect of the machine in combination with the fact that the tire has been turned round in its position of mounting in the machine means that in a second measuring run the tire is now driven in its same direction of rotation as the direction in which it rotated in the first measuring run, thereby being rolled against the test surface. A restoring moment is also formed from the tangential force measurement values in the above-described manner, during the second measuring run.

Taking then the two restoring moment values which were obtained during the two measuring runs, the procedure then involves forming the restoring moment which is related to the center of the contact surface or patch of the tire being tested. That restoring moment is the desired restoring moment to be ascertained, which, as indicated above, is also referrd to as 'torque steer effect' in the art.

It will be noted at this point that the tangential force acting on the tire during a measuring run is dependent on its peripheral speed. Tangential forces increase with increasing speed and above a given speed value such forces increase exponentially (reference may be made in that respect to German patent application No. P 38 21 262.5). By suitably adjusting the peripheral speed of the tire in the first and second measuring runs, it is possible to ensure that the components of the restoring moment, which result from lateral forces, is negligible relative to the component of the restoring moment which is due to the tangential forces.

In the operating procedure in accordance with the invention, evaluation of the restoring moments obtained in the first and second measuring runs is effected in such a way that the instantaneous component of the restoring moment, which results from the center of the tire contact surface or patch being spaced from a reference line or plane which is fixed by the design configuration of the testing machine and which extends parallel to the tangential forces generated in the testing operation is eliminated. When the test surface of the machine is in the form of a rotatable test drum, that reference line or plane is a plane passing through the middle of the drum normal to the axis thereof.

Preferably the measurement signals produced are evaluated in such as way that half the difference is formed from the restoring moment values obtained in the first and second measuring runs. That then provides an electrical signal which is proportional to the desired restoring moment which is related to the center of the tire contact surface. However it is also possible for half the sum of the restoring moments obtained from the first and second measuring runs to be subtracted from one of the restoring moments obtained in the measuring runs.

The invention thus provides for zeroing of the measuring system because by carrying out the procedure according to the invention, the component of the basic restoring moment which is due to the design configuration and mode of operation of the machine is eliminated, thereby enhancing the level of measurement accuracy in the tire testing operation.

Further objects, features and advantages of the invention will be apparent from the following description of preferred embodiments.

DESCRIPTION OF PREFERRED EMBODIEMENTS

Figure 1:
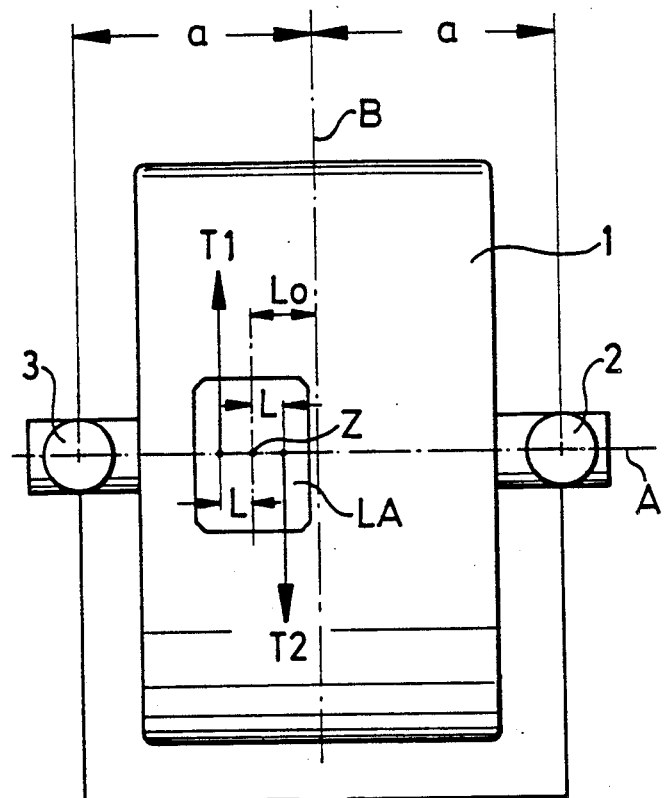
FIG. 1 shows a first embodiment of an apparatus according to the invention.

Referring to the apparatus embodiment illustrated in FIG. 1, reference numeral 1 therein denotes a test surface against which a tire to be tested is in rolling contact, the test surface being in the form of a test drum of a tire testing machine, the overall design configuration of which is not illustrated in the drawing for the sake of clarity, insofar as it is generally known.

Arranged at each side of the tire testing drum 1 on the axis thereof as indicated at A in FIG. 1 are first and second force measurement transducers 2 and 3 for detecting tangential forces T1 and T2 during measuring runs to which further reference will be made below. In the course of the measuring runs, a pneumatic tire (not shown) to be tested is applied to and pressed against the peripheral surface of the rotatable test drum 1, with a given test pressure. The contact between the test drum 1 and the pneumatic tire to be tested occurs at an area of the tread of the tire which is indicated at LA in FIG. 1, being referred to as the contact surface or contact patch and also identified as the footprint of the tire. The force measurement transducers 2 and 3 are disposed at equal spacings at indicated at a from a central plane B which extends normal to the axis A of the test drum 1, through the center of the peripheral surface of the drum. The position of the plane B is governed by the design configuration of the machine, in regard to the arrangement of the test drum 1 and the force measurement transducers 2 and 3 in the testing machine.

In the condition shown in FIG. 1, the contact surface or patch LA of the pneumatic tire against the surface of the test drum 1 is in an asymmetrical position relative to the plane B. More specifically, the center Z of the contact surface LA is at a spacing Lo from the plane B.

If a measuring run involves testing a pneumatic tire whose rolling resistance differs in the axial direction within the contact surface LA, that results in the generation of a tangential force vector which is laterally displaced relative to the center Z of the contact surface LA, being displaced for example by a distance as indicated at L. That distance or spacing L of the tangential force vector from the center Z of the contact surface LA is operative as a lever arm, so that a torque is produced in the contact surface LA between the tire to be tested and the surface of the test drum 1. The torque resulting therefrom can be determined by means of the force measurement transducers 2 and 3 which detect the tangential forces involved.

The measurement values which are supplied by the force measurement transducers 2 and 3 also include the torque component which results from the spacing Lo of the center Z of the contact surface LA from the central plane B of the test drum 1.

If a pneumatic tire which exhibits a rolling resistance that differs within its contact surface LA is tested in a first measuring run, then a tangential force vector as indicated at T1 is produced. That tangential force vector gives rise to a restoring moment as follows:

$$MRI = T1(L + Lo) \qquad (1).$$

The forces which are detected at the first and second transducers or measurement value pick-ups 2 and 3 and which result from that restoring moment are subtracted from each other in a subtracting means 13 which is connected to the outputs of the transducers 2 and 3, and the output of the subtracting means 13 is then multiplied in a multiplier 4 by the spacing a of the transducers 2 and 3 from the plane B. As described in German patent specification No. 2 326 046 to which reference may therefore be usefully directed, that then gives the restoring moment MRI resulting from the tangential force T1. As can be seen from above-specified equation (1) however, that restoring moment also includes the component which results from the spacing Lo of the center Z of the contact surface LA from the plane B. However, it is only the restoring moment which is related to the center Z of the contact surface LA that is a matter of interest in terms of a characteristic of the tire being tested. That moment is operative about an axis which extends through the center Z of the contact surface LA, normal thereto.

Now, in order to ascertain that restoring moment, the invention provides that a second measuring run is also carried out, in which the tire to be tested is turned round through 180° about its vertical axis, thus being turned side-for-side so that for example the side of the tire which is FIG. 1 faces towards the left in the drawing in the first measuring run then faces towards the right in FIG. 1 for the second measuring run. In order that the conditions under which the tread portion of the tire rolls against the peripheral surface of the test drum 1 are the same in the second measuring run as in the first measuring run, the drive for the tire is reversed. That means that, in relation to its axis, the tire rotates in the second measuring run in the same direction of rotation as the direction in which it rotated in the first measuring run. It will be appreciated however that, because the tire has been turned round through 180° about its vertical axis, the test drum 1 now rotates in the opposite direction in the second measuring run, to its direction of rotation in the first measuring run.

If the tire to be tested is not driven in rotation by the test drum 1, but is driven by a drive specifically operatively associated therewith, then the direction of rotation of the specific drive for the tire is also reversed in the second measuring run.

In the second measuring run, the fact that the rolling resistance of the tire against the peripheral surface of the test drum 1 is non-uniform within the contact surface LA means that a tangential force vector T2 is produced, which is also at a spacing L from the center Z of the contact surface LA. The restoring moment MRII which is produced in the second measuring run is in accordance with the following relationship:

$$MRII = T2(Lo - L) \qquad (2)$$

As the conditions under which the tire rolls against the periphery of the test drum 1 are the same in both of the first and second measuring runs, the following relationship applies:

$$T1 = T2 = T \qquad (3)$$

Looking still at FIG. 1, it will be seen that connected to the outputs of the first and second force measuring transducers 2 and 3 is an evaluation circuit in which the multiplying circuit 4 in which the output signal of the subtracting means 13 is multiplied by the spacing a supplies an output signal corresponding to the respective moment MRI and MRII after each of the first and second measuring runs. The output signal from the multiplying circuit 4 is passed by way of a change-over switch 7 into first and second storage means 5 and 6. In the illustrated embodiment in FIG. 1, the electrical signal corresponding to the moment MRI is passed to the storage means 5 and the electrical signal corresponding to the moment MRII is passed to the storage means 6.

In a subtracting circuit 8 connected to the outputs of the first and second storage means 5 and 6, the signal which is produced in the second measuring run and which corresponds to the moment MRII and which is stored in the storage means 6 is subtracted from the electrical signal which is formed in the first measuring run and which corresponds to the moment MRI. The subtracting means 8 carries out the following computation:

$$MRI - MRII = T(Lo + L) - T(Lo - L) = 2TL \qquad (4)$$

Connected to the output of the subtracting circuit 8 is a dividing circuit 9 for halving the output signal of the subtracting circuit 8. At its output the dividing circuit 9 then produces an electrical signal corresponding to the restoring moment to be determined, MR = TL, which is related to the line extending in normal relationship through the center Z of the contact surface LA. That moment is then used as a characteristic value in the tire testing operation.

Figure 2:
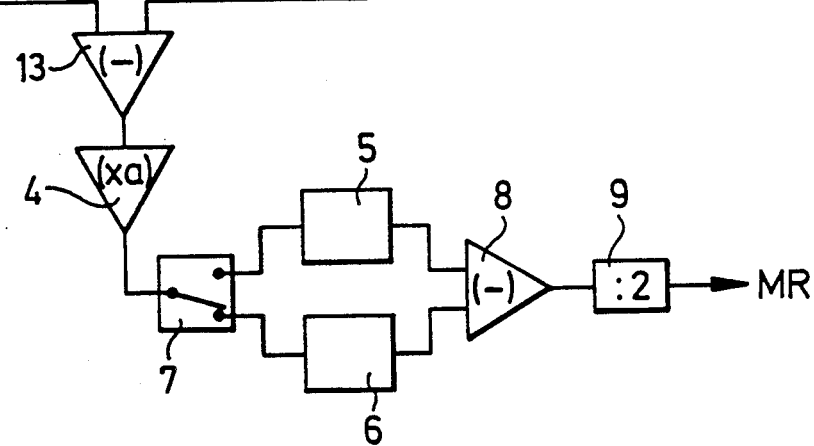
FIG. 2 shows a modified embodiment of the apparatus of the invention.
Figure 2:
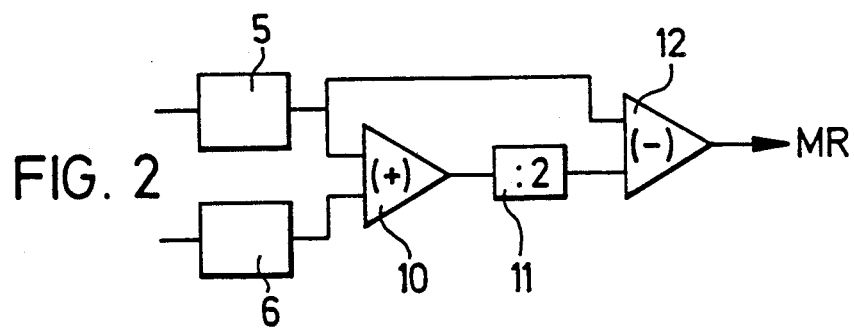

Reference will now be made to FIG. 2 which shows a modified form of the evaluation circuit of the testing assembly, as another embodiment of the principles of the present invention. The measuring arrangement generally is the same as that shown in FIG. 1 and the signal flow in the first part of the evaluation circuit in FIG. 2 involves the same components as those used in the FIG. 1 construction, up to and inclusive of the storage means 5 and 6. In other words, in the embodiment shown in FIG. 2 the outputs of the first and second force measuring transducers 2 and 3 are also connected to the subtracting circuit indicated at 13 in FIG. 1 while the output of the subtracting circuit is in turn connected to a multiplying circuit corresponding to the circuit indicated at 4 in FIG. 1 and also having its output connected to a change-over switch as indicated at 7 in FIG. 1. The FIG. 2 embodiment also provides that the electrical signal corresponding to the moment MRI which was formed in a first measuring run is stored in a storage means 5 while the moment MRII which was formed in a second measuring run is similarly stored in a storage means 6.

As a modification from the FIG. 1 configuration of the evaluation circuit, the output of the storage means 5 is connected to a first input of an adding circuit 10, and to a subtracting circuit 12. The output of the storage means 6 is also connected to the second input of the adding circuit 10. The adding circuit 10 is operable to add the two signals formed in the measuring runs, corresponding to the moments MRI and MRII. The adding circuit 10 therefore performs the following computation:

$$MRI + MRII = T(Lo+L) + T(Lo-L) = 2TLo \qquad (5)$$

The output of the adding circuit 10 is connected to the input of a dividing circuit 11 for halving the output signal from the adding circuit 10. At its output the dividing circuit 11 therefore provides an electrical signal corresponding to the value TLo.

The output of the dividing circuit 11 is connected to the second input of the above-mentioned subtracting circuit 12, the first input of which is connected to the output of the storage means 5, as already indictaed above. The subtracting circuit 12 is operable to subtract from the electrical signal corresponding to the moment MRI produced in the first measuring run, the output signal from the dividing circuit 11, corresponding to the value TLo. The subtracting circuit 12 therefore performs the following computation:

$$MRI - TLo = T(Lo+L) - TLo = TL \qquad (6)$$

Therefore, a signal corresponding to the desired characteristic MR=TL also appears at the output of the subtracting circuit 12. That signal is in this case also an electrical signal which is proportional to the restoring moment which is operative about a line passing through the center Z of the contact surface LA in normal relationship thereto.

It will be appreciated that, instead of a test drum as the test surface, it is also possible to use an endless belt which passes around first and second rollers. The principle of the invention can be used wherever the contact surface LA of the pneumatic tire to be tested is disposed asymmetrically relative to a central plane B from which the first and second transducers 2 and 3 are at equal spacings.

It will be seen therefore that the invention provides a method and an apparatus for determining a restoring moment produced by tangential forces in a tire testing machine, involving performing first and second measuring runs in which the tire to be tested is turned round through 180° between the first and second measuring runs, with the conditions under which the tire is in rolling contact with the test surface being the same in the two measuring runs, while the restoring moment which is related to the center of the tire contact surface or patch is formed from the restoring moment values obtained in the two measuring runs.

It will be appreciated that the above-described method and apparatus in accordance with the invention have been set forth solely by way of example and illustration of the principles of the invention and that various modifications and alterations may be made therein without thereby departing from the spirit and scope of the invention.

I claim:

1. A method of determining a restoring moment produced by tangential forces in a tire testing operation in a tire testing machine, comprising performing first and second measuring runs in which the tire to be tested is brought into contact with a test surface at a tire contact surface and is rolled against the test surface, obtaining tangential force measurement values and forming the restoring moment from said tangential force measurement values, wherein between the first and second measuring runs the tire is repositioned so that the direction of the tire drive is reversed, and a restoring moment which is related to the center of said contact surface is formed from the restoring moments obtained in the first and second measuring runs.

2. A method as set forth in claim 1 wherein the peripheral speed of the tire in the measuring runs is so high that the component of the restoring moment which results from lateral forces is negligible relative to the component originating from the tangential forces.

3. A method as set forth in claim 1 wherein, when forming the restoring moment which is related to the center of the contact surface, the instantaneous component which results from the spacing between the center of the contact surface and a reference line which is governed by the machine configuration and which extends parallel to the tangential forces is eliminated from the restoring moments obtained in the measuring runs.

4. A method as set forth in claim 1 including forming half the difference of the restoring moments obtained in the measuring runs.

5. A method as set forth in claim 1 wherein half the sum of the restoring moments obtained in the measuring runs is subtracted from one of the restoring moments obtained in the measuring runs.

6. Apparatus for determining a restoring moment produced by tangential forces in a tire testing machine comprising a test surface against which in use a tire to be tested is pressed and rolled with a tire contact surface during first and second measuring runs, the second of which is performed with the tire turned side-for-side relative to the first run, force measurement transducer means for measuring tangential forces during the measuring runs, and an evaluation circuit connected to the transducer means for producing an electrical signal proportional to the restoring moment, the evaluation circuit including a subtracting circuit for subtracting the restoring moments obtained in the measuring runs from each other and producing a corresponding signal at its output, and a dividing circuit having an input connected to the output of the subtracting circuit for halving the output signal of the subtracting circuit.

7. Apparatus as set forth in claim 6 wherein the test surface is provided by a test drum and the transducer means comprises first and second force measurement transducers arranged at respective sides of the test drum on the axis thereof at the same spacing relative to a central plane of the test drum, which plane is normal to the axis of the test drum.

8. Apparatus as set forth in claim 7 wherein said central plane constitutes a reference plane which is parallel to the tangential forces.

9. Apparatus for determining a restoring moment produced by tangential forces in a tire testing machine comprising a test surface against which in use a tire to be tested is pressed and rolled with a tire contact surface during first and second measuring runs, the second of which is performed with the tire turned side-for-side relative to the first run, force measurement transducer means for measuring tangential forces during the measuring runs, and an evaluation circuit connected to the transducer means for producing an electrical signal proportional to the restoring moment, the evaluation circuit including an adding circuit for adding the restoring moments obtained in the measuring runs and producing a corresponding signal at its output, a dividing circuit for halving the output signal from the adding circuit, and a subtracting circuit having a first input for receiving an input signal proportional to a restoring moment obtained in one of the two measuring runs and having a second input for receiving the output signal from the dividing circuit.

10. Apparatus as set forth in claim 9 wherein the test surface is provided by a test drum and the transducer means comprise first and second force measurement transducers arranged at respective sides of the test drum on the axis thereof at the same spacing relative to a central plane of the test drum, which plane is normal to the axis of the test drum.

11. Apparatus as set forth in claim 10 wherein said central plane constitutes a reference plane which is parallel to the tangential forces.

12. A method of determining a restoring moment produced by tangential forces in a tire testing operation in a tire testing machine, comprising performing a first measuring run in which the tire to be tested is brought into contact with a test surface at a tire contact surface and rolls against said test surface, obtaining tangential force measurement values and forming a restoring moment from said tangential force measurement values, turning the tire side-for-side through 180° and reversing the direction of rotation of the tire drive, performing a second measuring run in which the tire is again brought into contact with the test surface at its tire contact surface and rolls against said test surface, obtaining second tangential force measurement values and forming a second restoring moment from said second tangential force measurement values, and forming from said restoring moments obtained in the first and second measuring runs a restoring moment which is related to the center of said tire contact surface.

* * * * *